United States Patent [19]
Rosov

[11] 3,708,891
[45] Jan. 9, 1973

[54] SPOKEN QUESTIONNAIRE METHOD AND APPARATUS

[75] Inventor: Robert J. Rosov, Springfield, Oreg.

[73] Assignee: Oregon Research Institute, Eugene, Oreg.

[22] Filed: Jan. 18, 1971

[21] Appl. No.: 107,219

[52] U.S. Cl. ...................................................35/9 A
[51] Int. Cl. ..............................................G09b 7/00
[58] Field of Search ..............................35/9 A, 48 R

[56] References Cited

UNITED STATES PATENTS

| | | | |
|---|---|---|---|
| 3,210,864 | 10/1965 | Tillotson et al. | 35/9 A |
| 3,407,513 | 10/1968 | Conn | 35/9 A |
| 3,141,243 | 7/1964 | Chapman et al. | 35/9 A |
| 3,500,559 | 3/1970 | Jones et al. | 35/48 R |

*Primary Examiner*—Wm. H. Grieb
*Attorney*—Eugene D. Farley

[57] ABSTRACT

The method and apparatus for the automatic questionnaire presentation and statement compilation involves the use of a magnetic tape playback unit carrying a multi-track magnetic tape pre-recorded to provide spoken questions for an individual, teletype statement printout signals, binary question identification code signals, binary next question search code signals for yes, no, and undecided individual responses, and operating control signals for tape speed and timing and for start and stop of audio and teletype signals. The electrical outputs of the playback unit are connected to a digital logic control unit to which also is connected the electrical outputs of a patient response unit. The logic control unit is programmed to control the playback unit to select from a questionnaire on the tape questions corresponding to individual responses to previous questions, and to select from a plurality of modulating codes on the tape, each representing a statement, appropriate codes for modulating a teletype unit to provide printout of statements pertinent to the individual responses.

3 Claims, 3 Drawing Figures

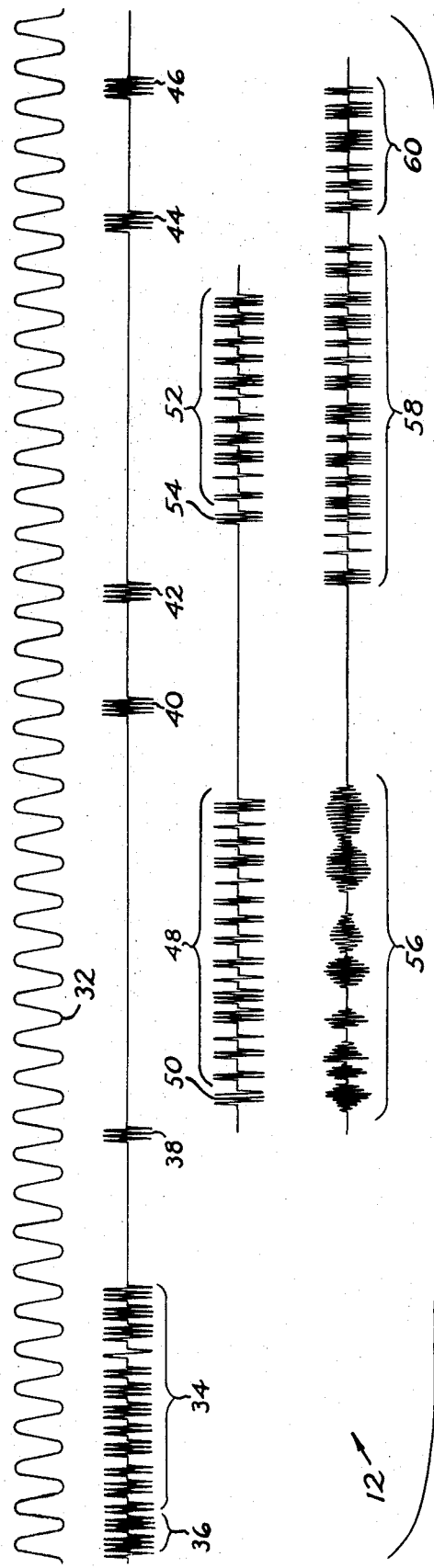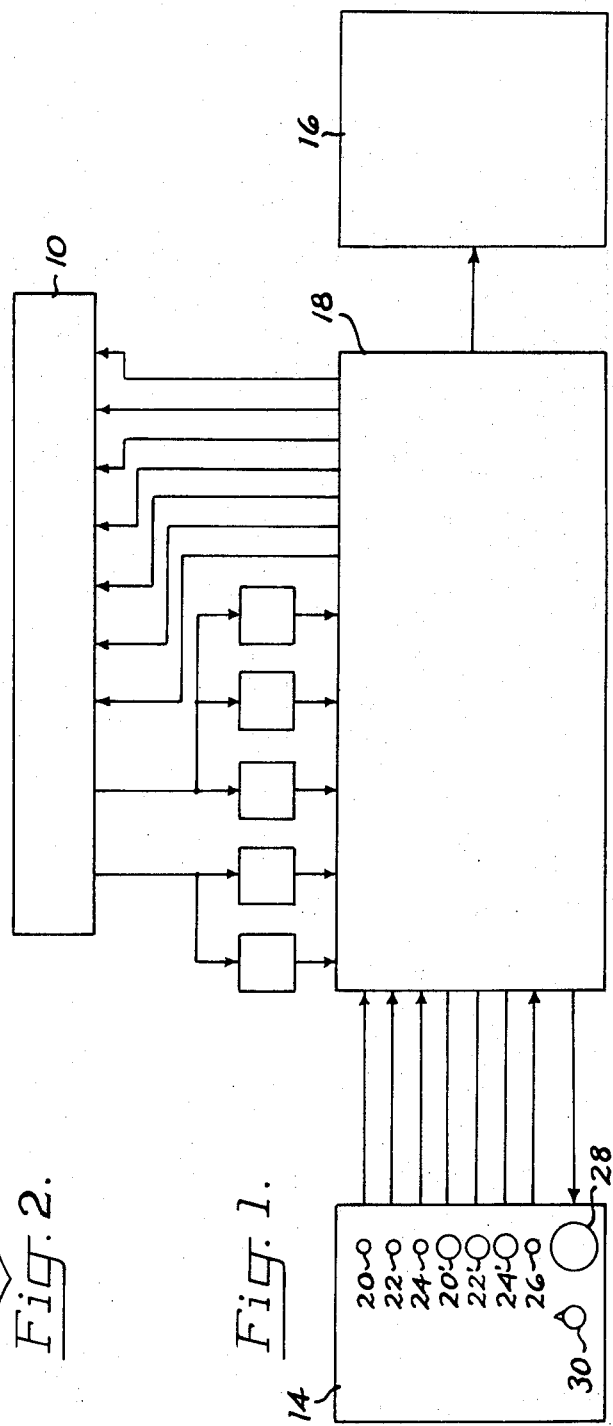

Robert J. Rosov
INVENTOR
BY
Atty.

SPOKEN QUESTIONNAIRE METHOD AND APPARATUS

BACKGROUND OF THE INVENTION

The invention described herein was made in the course of, or under, a grant from the U. S. Public Health Service, Department of Health, Eduction, and Welfare.

This invention relates to the spoken presentation of questionnaires to individuals and obtaining a printed listing of statements relevant to the responses from same, more particularly to the compilation of medical histories of patients, and specifically to method and apparatus by which the medical history of a patient may be compiled automatically.

Medical histories of patients heretofore have been compiled by direct conferences between doctor and patient. Because of the substantial amount of time that this procedure takes from the physician, it has been replaced generally by pen and paper questionnaires completed by the patient and used directly as end documents. Although this procedure releases the physician for more important duties, the completeness and accuracy of the end document leave much to be desired.

Efforts have been made heretofore to develop medical histories by use of pre-printed cards requiring sorting by the patient into yes and no categories, or by use of written branching questionnaires which lead the patient to subsequent questions, depending upon the patient's answer to preceding questions. Both of these procedures tend to frustrate and confuse the patient.

Efforts also have been made heretofore to utilize computer controlled questionnaires which provide automatic presentation, branching and printout. The excessive cost of computer equipment renders such procedure economically unfeasible for much of the medical profession.

SUMMARY OF THE INVENTION

In its basic concept the method and apparatus of this invention involves the use of a magnetic tape pre-recorded to provide electric signals representing a spoken questionnaire and a plurality of modulating codes each representing a statement appropriate to certain responses of the individual to the questions. These signals, together with electric signals produced by a response unit, function to activate a programmed logic control unit which may function to select the order of questions to be presented to the individual and which also functions to select appropriate modulating codes to provide printout of statements pertinent to the individual's responses.

It is by virtue of the foregoing basic concept that the principal objective of this invention is achieved; namely, to overcome the aforementioned disadvantages associated with prior medical history taking procedures.

Another object of this invention is the provision of apparatus of the class described in which the substitution of magnetic tapes accommodates multi-lingual and multi-specialty questionnaires at minimum cost.

A further object of this invention is to provide apparatus of the class described which utilizes commercially available components in a simplified and therefore relatively inexpensive assembly, whereby the apparatus is available at sufficiently low cost for use in physicians' offices, clinics, health stations and the like.

The foregoing and other objects and advantages of this invention will appear from the following detailed description taken in connection with the accompanying drawings of the preferred embodiment.

BRIEF DESCRIPTION OF THE DRAWINGS

FIG. 1 is a schematic electrical diagram in block form showing the general arrangement of apparatus embodying the features of this invention.

FIG. 2 is a graphic representation of a plurality of wave forms of electric signals produced from a pre-recorded magnetic stereo tape and illustrating one cycle of operation of the apparatus.

DESCRIPTION OF THE PREFERRED EMBODIMENT

Figure 3:
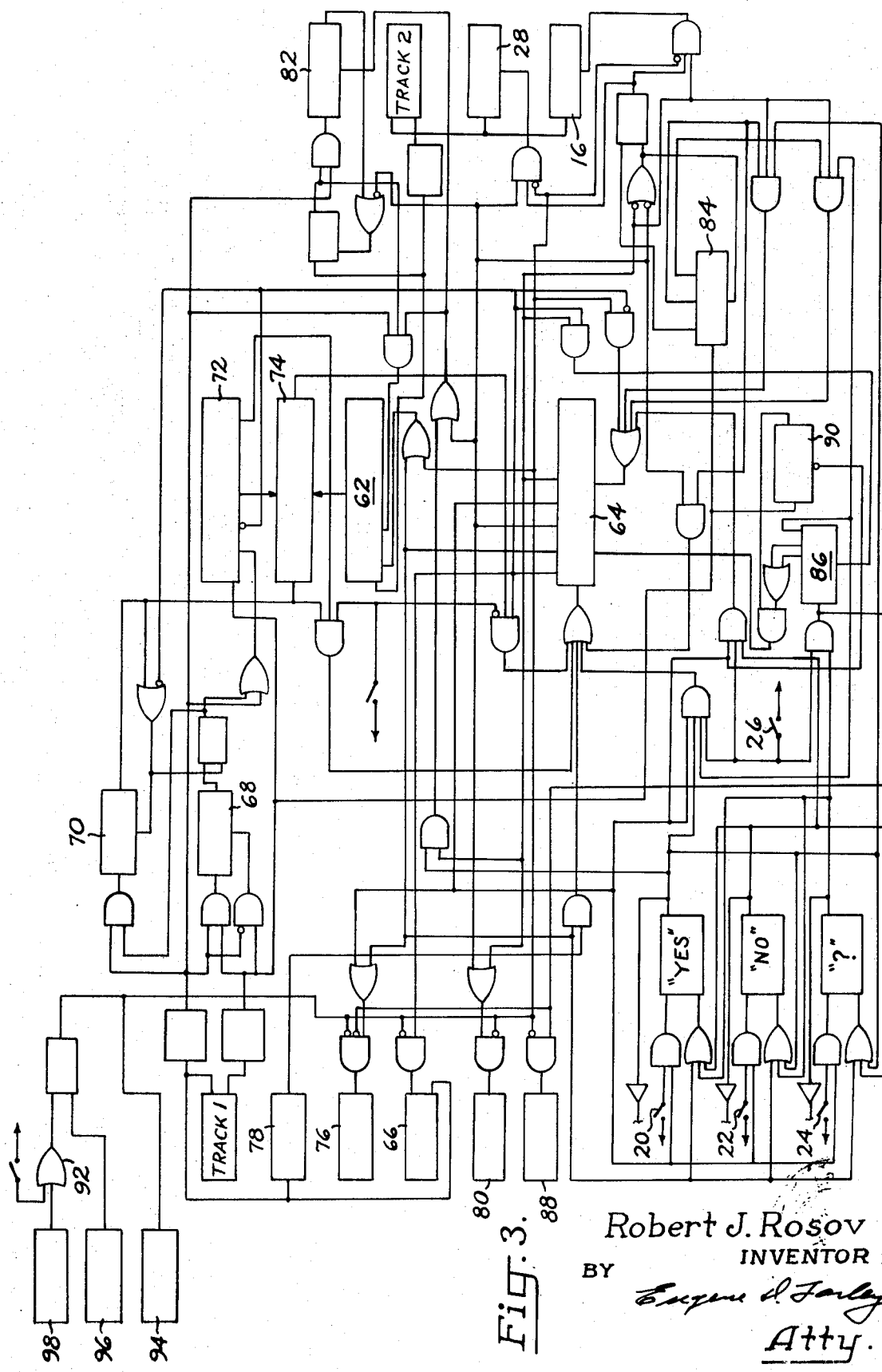
FIG. 3 is a schematic electrical diagram, partly in block form, showing in greater detail the components of the apparatus shown in FIG. 1.

Although the method and apparatus of this invention may be employed for the compilation of data corresponding to a wide variety of questionnaires, the following description illustrates the invention in relation to the taking of a medical history of a patient.

Referring primarily to FIG. 1 of the drawings, the apparatus of this invention comprises essentially the cooperative association of a magnetic tape playback unit 10 and associated pre-recorded magnetic tape 12 (FIG. 2), preferably in the form of a cassette, a patient response unit 14, a teletype unit 16 and a digital logic control unit 18.

The magnetic tape playback unit 10 preferably is of the conventional home entertainment stereo cassette tape recorder type. Its functions are to present the questions to the patient, to provide electrical modulating signals to the teletype unit for the printout of medical findings, to provide the control unit with electrical identification code signals of the next question to be asked of the patient, and to provide electrical control signals for question identification code, tape speed and timing, and the beginning and end of spoken questions and teletype modulation. It will be understood that all of these electric signals are produced by the playback unit in response to corresponding information pre-recorded on the magnetic tape 12.

The patient response unit 14 comprises a console before which the patient may be seated and on the face panel of which are mounted three electrical push-button switches 20, 22 and 24 and associated indicator lamps 20', 22' and 24'. The push-button switch 20 designates a "yes" response (FIG. 3); the push-button switch 22 designates a "no" response; and the push-button switch 24 designates a "don't know," "don't understand," or other indefinite response, indicated by the symbol "?." The indicator lamp associated with each push-button switch provides visible indication to the patient of the response made. The push-button switches are suitably interlocked against multiple choices and manipulation at other than response times.

Also mounted on the console is an electric push-button switch 26, which may be designated a "ready" button to signify to the patient his readiness to have his response choice recorded. This push-button switch also is suitably interlocked with the other switches to prevent entries without a selection having been made or to prevent manipulation at inappropriate times.

The console also mounts a speaker 28 for presenting to the patient spoken questions pre-recorded on the tape 12, and an associated volume control 30 allows the patient to adjust the level of sound.

The teletype unit 16 may be a conventional, commercially available automatic send/receive unit which prints out the medical findings corresponding to the modulating codes on the tape 12. The teletype unit also may include a punched paper tape output for computer processing, if desired.

The control unit 18 comprises an assembly of digital logic modules which controls and coordinates the functions of the three units previously described. The control unit assembly is shown in greater detail in FIG. 3 and is described hereinafter in connection with the operation of the apparatus.

The magnetic tape 12 associated with the playback unit preferably is of the stereo cassette type, providing two or more tracks, and is pre-recorded to provide the playback unit with the electric signals illustrated in FIG. 2.

Thus, for example, track 1 provides a 20 Hz signal 32 which serves as a clock to which all binary and control information on the tape is synchronized and, in addition, serves as a speed control for fast tape speeds.

The 20 Hz clock signal is a reference frequency by which fast forward speed tape can be controlled within predetermined limits to maintain code frequencies within the playback bandwidth. Thus, assuming a playback response of 20 to 16,000 Hz, this permits a speedup by a factor of 20 in the fast forward search mode, so that the clock frequency is raised to 400 Hz and the code and control pulses are raised to 16,000 Hz at the maximum fast forward speed allowed by the controlling clock frequency.

Track 1 also provides an 800 Hz signal which supplies a binary question identification code 34, illustrated as 12 bits and preceded by two start code bits 36, at the beginning of each question frame. The 800 Hz signal also provides the illustrated 5 control bits 38, 40, 42, 44 and 46 which effect the start and stop of the audio question, the teletype modulation for the finding, and the symbol "?" designating an indefinite answer. The various bits are synchronized with the 20 Hz clock signal.

Track 2 provides a 15 kHz search code signal 48 for a "no" response, preceded by a single start code bit 50, and a search code signal 52 for a "yes" or "?" response, preceded by a single start code bit 54. These signals are in the form of binary identification codes synchronized with the clock signal for instructing the control unit 18 which question to find next.

Track 2 also provides the audio question signals 56 and a 1 kHz teletype modulation signal 58 for producing a printout of a significant medical finding. The teletype modulation signal 60 for the "?" symbol also is provided.

The spoken question is recorded in the range of 0.1 to 10 kHz between the first two control bits 38 and 40, the teletype modulation producing the printout of a significant medical finding is recorded between the third and fourth control bits 42 and 44, and the teletype modulation indicating an indefinite answer is recorded between the fourth and fifth control bits 44 and 46.

The electrical circuit of FIG. 3 is best described in connection with the operation of the apparatus, as follows:

Let it be assumed that track 2 has been pre-recorded to provide a plurality of appropriate questions 56, preferably of the branching questionnaire type, search codes 48 and 52 and significant finding modulations 58, and that a search code has been entered in the 12 bit searching shift register 62. Let it also be assumed that the 5 count program counter/decoder 64 is in its first, or reset state. In this condition the system is in that part of its operating cycle in which it is searching for the next question. The playback unit 10 accordingly is switched to fast forward. The clock frequency in track one is squared and fed back to the fast forward speed control 66 which essentially is a slope filter with a negative slope set so as not to permit the clock to exceed 400 Hz.

Tone pulses 36 in the 800 to 16,000 Hz band are filtered, rectified and squared. If two consecutive tone pulses occur, this is registered by a two count counter 68 which causes a binary and 12 count counter 70 to be turned on, allowing the clock to run the sampling shift register 72 for the next 12 clock pulses to shift in the identification code 34. At the end of 12 shifts the sampling shift register and the searching shift register are compared by the comparison gates 74. If they are not identical, the binary and both counters are reset in anticipation of the next code. Single control pulses simply cause the two count counter to reset on the second, "empty" clock pulse.

If the codes are identical, the program counter 64 advances to the second, or brake position on receipt of a program advance pulse. In this state the fast forward drive is switched off and the brake function 76 is activated. In this regard the playback unit is modified to provide a strong electromagnetic braking current on the fast forward motor in order to cut the coasting time to a minimum to conserve tape and reduce waiting time. A stop sense function 78 is activated to detect the absence of the squared clock frequency, which occurs when the tape speed has been reduced below its slow forward speed. This causes the program counter 64 to advance to the third position, disabling the brake and switching in the slow forward playback function 80.

Upon detection of the first single control pulse 38 from track 1, a binary is pulsed and track 2 audio 56 in the voice band is gated onto the patient's speaker 28 to present a question to the patient. At the same time the first 15kHz mark pulse 50 from track 2 turns on a binary and a 12 count counter 82 to permit subsequent code pulses to be loaded into the 12 storage elements of the searching shift register 62. Upon termination of track 2 audio and code data, the second 800 Hz control pulse 40 from track 1 causes the program counter 64 to advance to the 4th position.

The slow forward playback, patient audio and code loading functions now are disabled and the brake and patient choice selection switch binaries are enabled. This allows the patient to cause illumination of the indicator lamp corresponding to his choice of response, and thereafter to change his mind if desired. The choice binaries gated from each switch are interlocked to prevent two or more choices from registering simultaneously, yet permitting the patient to change his mind by enabling a new choice.

When the patient has made a choice, the "ready" switch binary is enabled. When the "ready" push-button switch 26 is depressed, the program counter 64 is advanced to the 5th position, whereupon further patient control over the choice functions is inhibited.

If the patient choice was a "no" answer, the program counter 64 is reset to its first state, whereupon the playback unit is switched to fast forward search speed for further searching for the code entered in the searching shift register 62 which corresponds to the next question to be asked for the "no" response.

If the patient's choice is a "yes" response, the program counter 64 is advanced to its 5th position. Under this condition the playback unit is continued in its slow forward speed and the brake is released. Upon receipt of the third control pulse 42 from track 1, a three-count sub-program counter/decoder 84 is stepped to its first position. This switches the teletype 16 to the 1 kHz control frequency 58 on track 2. This frequency is pulsed in ASCII code at a 110 baud rate and causes the teletype to print out a question code number and the medical history finding which corresponds to the question to which the patient made an affirmative response.

At the same time, a 15 kHz mark pulse 54 on track 2 sets a binary enabling the 12 count counter 82 to allow the subsequent 12 clocked bits of a question code 52 to be entered into the searching shift register 62 in the case of an affirmative response. This is done in order to direct the questionnaire to a branch appropriate to a positive finding.

Upon receipt of the fourth control pulse 44 the three-count counter 84 is advanced to its second state. If the patient's choise was an affirmative response the program counter 64 is reset to its first state and the playback unit searches for the next question to be asked for that affirmative response.

If the patient's choice is an indefinite response, the program counter 64 is retained in its 4th position, and the 3 count counter 86 is incremented to its first state, which causes a slow reverse function 88 to be activated. The two control bits 40 and 38 are detected as the tape is reversed, which causes a 2 count counter 90 to reset the program counter 64 to its second state, which in turn causes the question to be replayed.

If the patient's choice now is either "yes" or "no," the program counter 64 is incremented and the sequence of events described above for definite responses occurs. On the other hand, if the patient's choice is again an indefinite response, the sequence of events described above for an indefinite response again occurs with the 3 count counter 86 incremented to its second state. If the patient's choice now is a definite response, the sequence of events described above for a definite response occurs.

If the patient's choice is a third indefinite response, the 3 count counter 86 is incremented to its third state. This in turn causes the program counter to be incremented to its 5th state. This causes the teletype 16 to print out the question code number and the medical history finding as described above.

However, the question code 52 is not read into the searching shift register 62 under this condition. The question code 48 instead remains in the searching shift register 62 so that the patient is not subjected to a branch involving detailed questions in response to an indefinite response. In addition, the fourth control pulse 44 is disabled from providing a reset to the program counter 62, and instead the teletype 16 is caused to print out a "?" symbol at the end of the statement in response to the corresponding modulation 60, signifying an indefinite response to the particular historical finding just printed out. When the fifth control pulse 46 is received, the program counter 62 is reset and the question code corresponding to the "no" response is sought.

Under a cold start condition, a reset binary 92 is enabled for a time sufficient to stabilize the logic and control circuit function, whereupon the reset binary is disabled. In its first state, the reset binary causes all logic functions to be disconnected from the tape playback unit except for the fast reverse function 94 which is switched on if a tape cassette has been loaded into the playback unit. The reset binary also causes the searching shift register 62 to be reset with zeros in its storage elements and the master program counter 64 to be reset to its first state, if it is not already in that state.

Regardless of the position of the tape in the cassette, the "beginning of tape sense" function 96 will be activated at some time causing the reset binary to be reset, disconnecting the fast reverse function 94 and returning the playback unit to logic control. Since the program counter is in its first state, the tape now searches forward for a dummy question, such as "all 12 bits zero", i.e. an isolated pair of track 1 control pulses near the beginning of the tape, and then instructions for the patient are played back from the tape. The logic control circuitry then performs its usual functions, as previously described.

When the end of the tape is sensed by the function 98, the playback unit is switched to fast reverse until the beginning of tape position is sensed by the function 96. The unit then stops, switches to fast forward and searches for the first question, as previously explained.

Accordingly, there is provided by the method and apparatus of this invention means for obtaining medical histories automatically from patients without the attendance of a physician but with a substantial degree of reliability and with significantly less fatigue, frustration and irritability of the patient. The speed and facility with which magnetic tape cassettes may be changed affords use of the apparatus for multi-lingual and multi-speciality questionnaires. The use of standard, commercially available components renders the apparatus economically feasible for use in physicans' offices, clinics and other similarly small units.

It will be apparent to those skilled in the art that various changes may be made in the size, number, type and arrangement of parts described hereinbefore without departing from thespirit of this invention.

Having now described my invention and the manner in which it may be used, I claim:

1. The method of presenting a spoken branching questionnaire to an individual, comprising
   a. pre-recording a magnetic tape to provide
      1. audio frequency intelligence signals representing branching questions for an individual, and
      2. electric teletype modulation signals representing statements corresponding to alternative responses of an individual to the questions,
   b. playing back the tape on a playback device to present spoken questions to the individual, and c. utilizing the response of the individual to the question to operate the playback device to feed appropriate signals of the electric teletype modulation signals to a teletype to print out a statement corresponding to the individual's response to the question and to play back to the individual a next question corresponding to the patient's response to the preceding question.

2. Questionnaire presentation apparatus, comprising
a. magnetic tape playback means,
b. a magnetic tape pre-recorded to provide from the playback means
  1. audio frequency intelligence signals representing branching questions for an individual, and
  2. electric teletype modulation signals representing statements corresponding to alternative responses of an individual to the questions,
c. a plurality of electric control switch means operable selectively by an individual to indicate responses to said questions,
d. electric control circuit means connected to the playback means and including said plurality of control switch means and responsive to selected actuation of the latter by an individual to operate the playback means to select and play back to the individual a next question correlated with the individual's response to the preceding question, and
e. teletype printout means connected to the playback means and operable to print out a statement corresponding to the electric modulation signals on the tape.

3. The apparatus of claim 2 wherein
a. the pre-recorded tape also provides from the playback means
  1. electric question identification code signals in binary form,
  2. electric next question search code signals in binary form, and
  3. electric control signals defining the beginning and end of said audio frequency intelligence signals, next question search code signals and teletype modulation signals,
b. and the electric circuit control means includes
  1. electric search signal storage means connected to the playback means and operable upon activation by a control signal to receive and store the electric next question search code signals,
  2. electric sampling signal storage means connected to the playback means and operable upon activation by a control signal to receive and store the electric question identification code signals, and
  3. electric signal comparing means interconnecting the search and sampling signal storage means and operable to compare the stored signal codes.

* * * * *